United States Patent
Patra (10) Patent No.: US 11,734,144 B2
(45) Date of Patent: Aug. 22, 2023

(54) MAINTAINING WORKLOADS DURING PERFORMANCE TESTING

(71) Applicant: International Business Machines Corporation, Armonk, NY (US)

(72) Inventor: Suman Patra, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 48 days.

(21) Appl. No.: 17/305,336

(22) Filed: Jul. 6, 2021

(65) Prior Publication Data

US 2023/0009974 A1 Jan. 12, 2023

(51) Int. Cl.
*G06F 11/34* (2006.01)

(52) U.S. Cl.
CPC ...... *G06F 11/3414* (2013.01); *G06F 11/3428* (2013.01); *G06F 11/3476* (2013.01)

(58) Field of Classification Search
CPC ............ G06F 11/3414; G06F 11/3428; G06F 11/3478; G06F 11/3476
USPC ........................................................ 702/186
See application file for complete search history.

(56) References Cited

U.S. PATENT DOCUMENTS

| | | | |
|---|---|---|---|
| 6,792,393 B1 * | 9/2004 | Farel ................... | G06F 11/0706 702/186 |
| 7,757,117 B2 | 7/2010 | Mittal | |
| 10,606,736 B1 | 3/2020 | Gardner | |
| 2006/0039538 A1 * | 2/2006 | Minnis ............... | H04B 17/3912 455/67.14 |
| 2007/0288625 A1 | 12/2007 | Chakra et al. | |
| 2008/0263410 A1 * | 10/2008 | Mittal ................. | G06F 11/3414 714/47.2 |
| 2015/0222494 A1 | 8/2015 | Broda et al. | |

OTHER PUBLICATIONS

"15 Best Performance Testing Tools (Load Testing Tools) In 2021", Mar. 3, 2021, 28 pages, <https://www.softwaretestinghelp.com/performance-testing-tools-load-testing-tools/>.
"Continuous Load Settings", Applies to LoadComplete 4.97, last modified on May 20, 2019, 2 pages, <https://support.smartbear.com/loadcomplete/docs/testing-with/configuring/load-test-editor/continuous-load.html>.
IBM, IBM Cloud Application Performance Management, Private 8.1.4, printed on Jun. 1, 2021, 5 pages, <https://developer.ibm.com/apm/docs/exploring-apm/>.
IBM, "Rational Performance Tester", printed on Jun. 1, 2021, 3 pages, <https://www.ibm.com/support/knowledgecenter/SSMMM5_9.2.0/com.ibm.rationaLtest.lt.doc/topics/c_rpt_ovr.html>.
Khan et al., "Soak Testing of Web Applications Based on Automatic Test Cases", International Journal of Engineering Research and Technology. ISSN 0974-3154, vol. 13, No. 12 (2020), pp. 4746-4750, © International Research Publication House, 6 pages.

(Continued)

*Primary Examiner* — John H Le
(74) *Attorney, Agent, or Firm* — Stephen R. Yoder (57) ABSTRACT

Monitoring a set of virtual users during performance testing and reporting virtual user operations data to ensure an ongoing and constant transactions per second load and providing test result data with evidence of constant transactions per second (TPS) during the test. Generating and executing performance tests under constant TPS includes restarting virtual users that are terminated during the performance tests.

20 Claims, 4 Drawing Sheets

(56) References Cited

OTHER PUBLICATIONS

Molyneaux, Ian, "Chapter 4. Interpreting Results: Effective Root-Cause Analysis", O'Reilly, printed on Jun. 1, 2021, 33 pages, <https://www.oreilly.com/library/view/the-art-of/9780596155858/ch04.html>.

* cited by examiner

MAINTAINING WORKLOADS DURING PERFORMANCE TESTING

BACKGROUND

The present invention relates generally to the field of performance testing of web applications, and more particularly to maintaining workloads during performance testing for a constant transactions per second (TPS) rate.

In the context of web development, performance testing entails using software tools to simulate how an application runs under specific circumstances. Quantitative performance testing looks at metrics like response time, speed, while qualitative testing is concerned with scalability, stability, and interoperability.

Some types of performance tests include: (i) load tests; (ii) stress tests; and (iii) soak tests. Load tests look at how increased workload affects an application's response time. For example, you can use load testing tools to see how your application performs with a certain number of simultaneous users. The purpose of load testing is to evaluate how your application behaves under normal working conditions. Stress tests, also called fatigue tests, are similar to load tests, but they look at how an application performs outside the boundaries of normal working conditions. The goal of stress testing is to determine how many concurrent users or transactions the application can handle before it crashes. Load and stress tests can help you identify bottlenecks and decide how to best use your resources to accommodate more traffic.

While load testing is primarily concerned with performance assessment, and stress testing is concerned with system stability under extreme conditions, soak testing is concerned with reliability over a long time. Also called endurance, capacity, or longevity tests, soak tests measure application performance over an extended period of time. Soak tests can help you identify memory leaks and similar mishaps that occasionally occur.

Some performance metrics used during testing include: (i) response time; (ii) average load time; (iii) peak response time; (iv) wait time; (v) requests per second; (vi) memory utilization; (vii) CPU utilization; (viii) error rate; (ix) transactions passed/failed; (x) concurrent users; and (xi) throughput. Response time is the amount of time between a specific request and a corresponding response. Response times can vary drastically for different actions under different conditions. Wait time, sometimes called average latency, refers the amount of time a request spends in a queue before it gets processed. Distinguishing between wait time and response time is important because they depend on different factors. The metric "requests per second" is the number of requests handled per second. A transaction is a unit of script, that is, the script is divided into transactions. Transactions per second refers to the number of times a transaction passes, fails, and stops during each second of testing.

SUMMARY

In one aspect of the present invention, a method, a computer program product, and a system includes: establishing a virtual user group from a set of virtual users for operation according to a test strategy; performing a soak test under a constant transactions-per-second load using the virtual user group; monitoring each virtual user of the virtual user group for a termination condition for the duration of the soak test; responsive to detecting a termination condition, identifying the terminated virtual user; and restarting a terminated virtual user during the soak test.

In another aspect of the present invention, a method, a computer program product, and a system includes: maintaining a simulated workload with the virtual users throughout the duration of the soak test; and collecting test report data during performance of the soak test including identification of each virtual user that is terminated, reason for termination of each virtual user, and average restart time for a terminated virtual user to be restarted during the soak test.

In yet another aspect of the present invention, a method, a computer program product, and a system includes preparing and presenting a soak test report for the soak test, the soak test report demonstrating a constant transactions-per-second load.

DETAILED DESCRIPTION

Monitoring a set of virtual users during performance testing and reporting virtual user operations data to ensure an ongoing and constant transactions per second load and providing test result data with evidence of constant transactions per second (TPS) during the test. Generating and executing performance tests under constant TPS includes restarting virtual users that are terminated during the performance tests. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
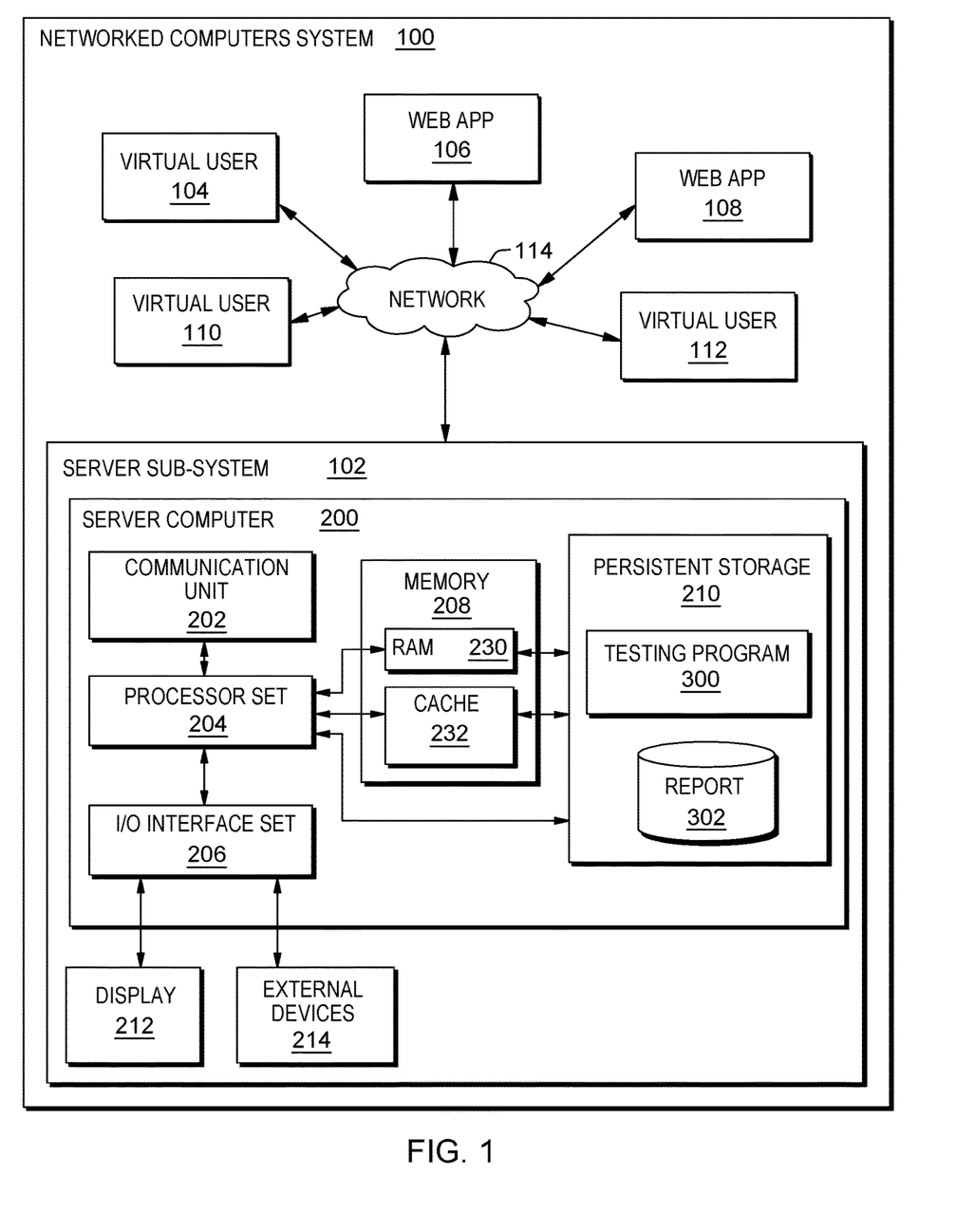
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: performance sub-system 102; virtual user sub-systems 104, 110, 112; web applications 106, 108; communication network 114; performance computer 200; communication unit 202; processor set 204; input/output (I/O) interface set 206; memory device 208; persistent storage device 210; display device 212; external device set 214; random access memory (RAM) devices 230; cache memory device 232; performance testing program 300; and reporting data store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Performance testing program 300 operates to monitor a set of virtual users during performance testing, especially during soak tests, and reporting virtual user operations data to ensure an ongoing and constant transactions per second load and provide test result data with evidence of constant transactions per second (TPS) during the test. Generating and executing performance tests under constant TPS includes restarting virtual users that are terminated during the performance tests.

Some embodiments of the present invention recognize the following facts, potential problems and/or potential areas for improvement with respect to the current state of the art: (i) what is needed is an improved technique or a program such that the continuous load (TPS) can be maintained during soak tests to ensure confidence in system availability and stability; (ii) because the load measured by transactions per second (TPS) decreases with abnormal user terminations, an ongoing soak test will not add much value to the application performance management (APM) process; (iii) considerable time and resources are lost during a failed soak test due to abnormal terminations of the virtual users; and/or (iv) the loss of time and resources from abnormal termination of virtual users causes delay in accessing and understanding the system availability and stability concerns caused when running the web application under soak-test conditions.

A well-performing web application is one that lets the end user carry out a given task without undue perceived delay or irritation. With a well-performing application, users can achieve what they set out to accomplish without their attention wandering. In terms of performance, key metrics include high speed, scalability, and stability of the web application. The soak test is a type of performance test to check if an application under test (AUT) can withstand continuous load, referred to herein by units of transactions per second (TPS), for a pre-determined extended time frame (such as 72 hours). Continuous heavy traffic for a long duration can cause several issues to arise in the application. Accordingly, an application development team may take corrective action based on how the system responds to running the application during soak tests.

Oftentimes during the soak test period, the virtual users for the test terminate abnormally. Abnormal terminations may occur for several reasons including subsystem failures and functional issues. When abnormal terminations occur, the predefined load may drop significantly. Because the load measured by transactions per second (TPS) decreases with abnormal user terminations, an ongoing soak test will not add much value to the application performance management (APM) process. Considerable time and resources are lost during a failed soak test due to abnormal terminations of the virtual users. The loss of time and resources from abnormal termination of virtual users causes delay in accessing and understanding the system availability and stability concerns caused when running the web application under soak-test conditions.

Some embodiments of the present invention facilitate soak testing when there is a license cost for virtual users while running the soak test. When the license cost is involved there will be a limited number of virtual users according to a testing budget. For example, if each licensed virtual user is operating while running the soak test, then even if a single virtual user is abnormally terminated, a backup for the lost user is not available since there are no additional virtual users. Some embodiments of the present invention recover the same component where the user is terminated. When the matching rule is not found then the virtual user is recovered.

Figure 2:
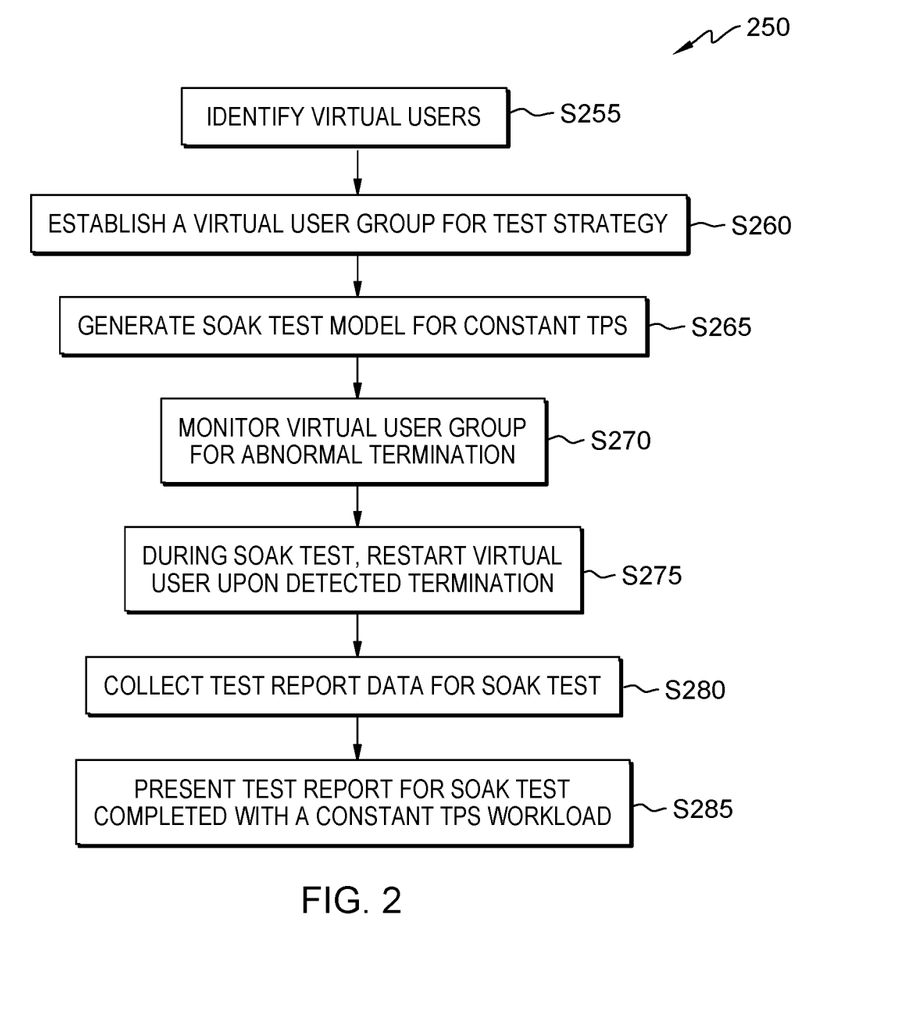
FIG. 2 is a flowchart showing a method performed, at least in part, by the first embodiment system.
Figure 3:
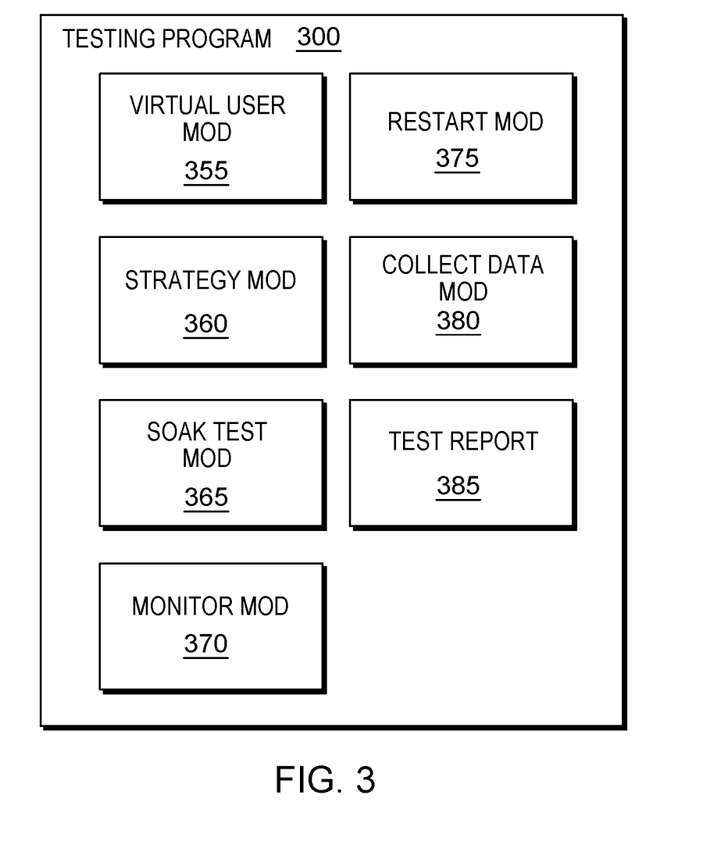
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where virtual user module ("mod") 355 identifies virtual users for use during performance testing. As discussed herein, the set of virtual users may be limited to a specific number needed to operate during performance tests such as soak tests. These limitations may be directly related to the cost of licensing virtual users. Other resource requirements may direct a particular limited number of virtual users be available during performance testing.

Processing proceeds to step S260, where strategy mod 360 establishes a virtual user group according to a testing strategy. Virtual users such as virtual users 104, 110 (FIG. 1) have pre-defined characteristics and functions that play particular roles in application workloads. The strategy module identifies certain virtual users based on user profiles including characteristics and functions to satisfy strategic requirements of a particular performance test. The performance testing strategy is developed based on detailed system analysis and describes an extended approach to performance testing. System analysis includes all the information regarding the software, testing goals, application requirements, test stand configuration, testing monitoring, user behavior scenarios, load profile, load model, performance testing tools, planned test runs, and the way of providing the results.

Processing proceeds to step S265, where soak test mod 365 generates a soak test model for constant transactions per second during the soak test. The soak test model engages the established virtual user group in such a way as to ensure constant transactions per second during the defined testing duration, such as 72 hours. Soak testing often demands long-term operations under heavy loads to sufficiently evaluate a web application. In this example, the long-term is 72 hours. Alternatively, long-term refers to another duration representing a relatively longer duration than other shorter-term tests.

Processing proceeds to step S270, where monitor mod 370 monitors the virtual user group for abnormal termination. In this example, abnormal termination is any termination of a virtual user during the soak test. Alternatively, certain virtual users are planned to terminate during testing and other virtual users are planned to initiate during testing so that the termination is not flagged as "abnormal" during the monitoring process.

Processing proceeds to step S275, where restart mod 375, during the soak test, restarts a virtual user within the group of virtual users upon detected abnormal termination of the virtual user. In this example, any virtual user in the group that terminates is restarted in order to maintain constant transaction per second performance of the web application during the soak test. Alternatively, not every termination is recognized as an abnormal termination, so only those virtual users experiencing an abnormal termination are restarted. By restarting the virtual users, the number of transactions per second are maintained throughout the testing process.

Processing proceeds to step S280, where collect data mod 380 collects test report data for the performance test. Collected test data may be stored for later generation of a test report. For example, reporting data store 302 (FIG. 1) stores collected test data during soak testing of web application 106 with a group of virtual users including virtual users 104, 110, and 112.

Processing ends at step S285, where test report mod 385 presents a test report for the performance test completed with a constant transactions per second workload. In this example, upon completion of the soak test, a soak test report is generated using collected test report data that may include, but is not limited to: (i) estimated total transactions per second; (ii) actual total transactions per second; (iii) total number of virtual users terminated; (iv) total number of virtual users restarted; (v) details of each virtual user terminated and the termination reason, for example, subsystem failures, functional issues, allocating memory is not being freed, memory violation errors, or system resources are being maximized; (vi) details of each virtual user restarted; and/or (vii) average time taken to restart a virtual user.

Further embodiments of the present invention are discussed in the paragraphs that follow and later with reference to FIG. 4.

The invention proposes a method to restart the virtual user whenever it is terminated and/or aborted to maintain the continuous heavy traffic for a prolonged period.

Some embodiments of the present invention perform steps including: (i) the performance testing strategy is developed based on detailed system analysis and describes an extended approach to performance testing where the system analysis includes all the information regarding the software, testing goals, application requirements, test stand configuration, testing monitoring, user behavior scenarios, load profile, load model, performance testing tools, planned test runs, and the way of providing the results; (ii) a soak test load model is designed where the continuous load generation for an extended period of time (e.g. 72 hours) is planned; (iii) user scenarios recorded and grouped such that enough test data are put in place to support the extended duration testing period; (iv) soak test scenario is created in controller where it hosts the virtual users and it contains the mechanism for load generation and load simulator; (v) the soak test run is started from the controller and the virtual users are running producing a continuous heavy traffic; (vi) when a virtual user, e.g. virtual user B, terminates abnormally, the controller identifies the terminated virtual user (virtual user B) and the controller restarts virtual user B and the virtual user starts running again. (vii) the controller scans each of the virtual users periodically, for example, at every two seconds, and for each scan, any virtual users that were terminated abruptly are restarted (in that manner, the TPS value remains the same over the soak test so that the specified heavy load on the system remains throughout the extended duration testing period); and/or (viii) when the extended duration soak test is completed with a constant TPS workload, all the abort and restart incidents info are logged into a logfile and referenced while generating a soak test report.

Some embodiments of the present invention are directed to a method to maintain a continuous heavy load for soak testing a web application. More particularly, embodiments of the present invention are directed to restarting a virtual user whenever it is terminated/aborted during the soak test to maintain the continuous heavy traffic for an extended period.

Further, embodiments of the present invention are directed to where a controller identifies the terminated virtual user that is terminated at any stage of the performance and soak test operation.

Still further, embodiments of the present invention are directed to where the soak test runs continuously and completes after the specified extended duration of the test with a constant transaction per second (TPS) load.

Even further, embodiments of the present invention are directed to the addition to the soak test report of certain virtual user details including: (i) which virtual users terminated during the soak test and the reason for early termination; (ii) details of each virtual user that was restarted; and (iii) the average time taken to restart a virtual user.

Some embodiments of the present invention generate a smart report with all the incident details of abort and termination which gives a deeper insight to performance engineer to improve the performance results and in much improved application performance management (APM) techniques.

Some embodiments of the present invention identify the terminated virtual user at any stage of a soak test and performance test run, whether during ramp up, steady state, or ramp down stages. The controller periodically scans all the virtual users, for example, scanning every two seconds. During each virtual user scan, all the virtual users that were terminated abruptly are restarted.

Some embodiments of the present invention do more than just maintain continuous heavy load for performance testing of a web application and simply restarting virtual users.

Some embodiments of the present invention restart the virtual user whenever it terminated/aborted to maintain the continuous heavy traffic for a prolonged period, identify the terminated virtual user which has been terminated at any stage of performance and soak test run, ensure the soak test is continuously running and is completed successfully with a constant transaction per second, and adds to the soak test report details of each virtual user terminated and termination reason, details of each virtual user restarted, and average time taken to restart a virtual user.

Figure 4:
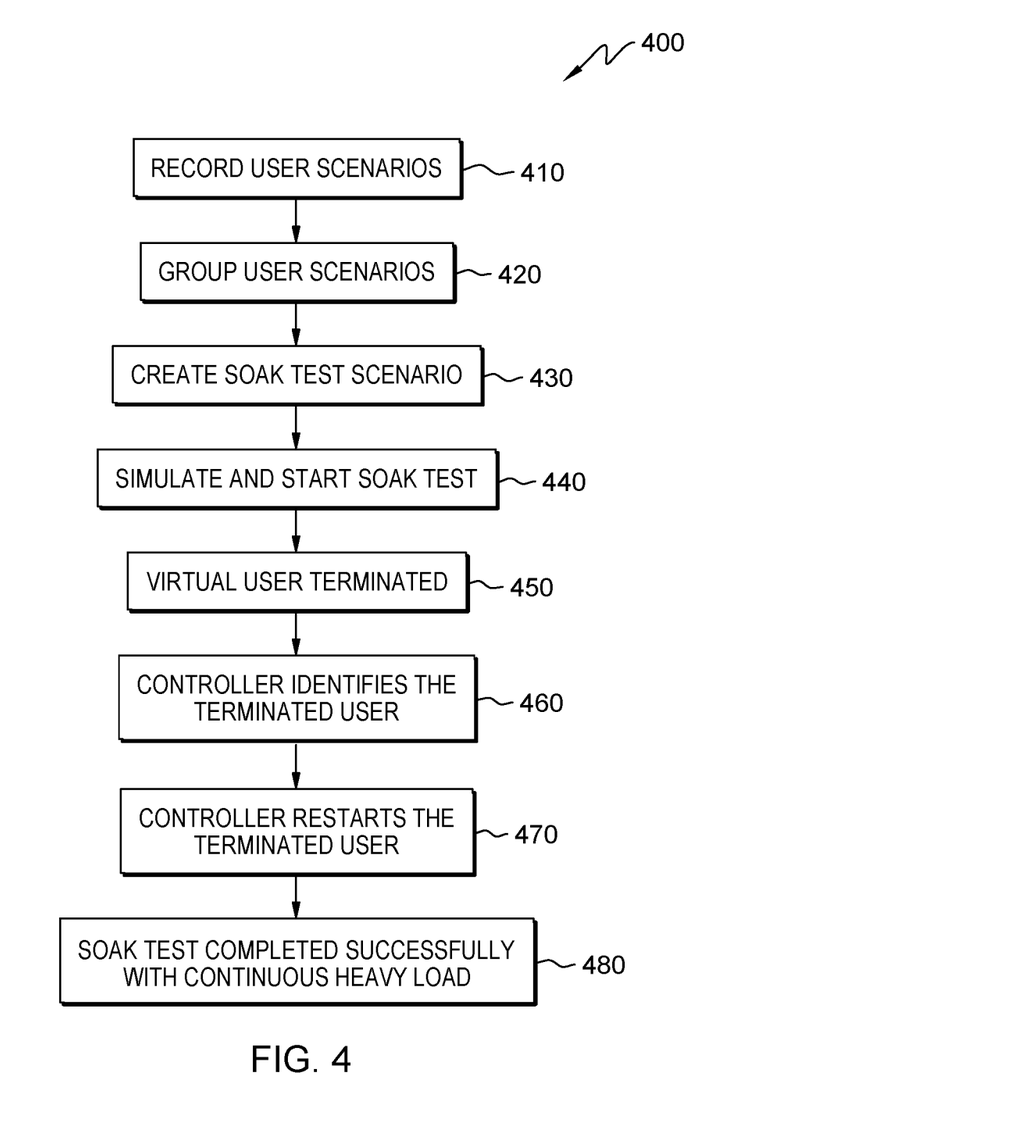
FIG. 4 is a flowchart view of a second embodiment of a method according to the present invention.

FIG. 4 shows flowchart 400 depicting a second method according to an embodiment of the present invention. This method will now be discussed, over the course of the following paragraphs, with extensive reference to FIG. 4 (for the method step blocks). The program causing the system to perform the following steps may be implemented in a networked computing system such as networked computing system 100 (FIG. 1).

Processing begins at operation 410 where user scenarios are recorded. Virtual user models are established for operation during the virtual user soak test.

Processing proceeds to operation 420 where user scenarios are grouped according to user characteristics and/or features relevant to soak testing.

Processing proceeds to operation 430 where a soak test scenario is created. The soak test scenario includes virtual users from various grouped user scenarios according to anticipated workload to be served during the soak test. As discussed herein, workloads are maintained by application of designated virtual users throughout the soak test. In that way, a constant load measured by transactions per second (TPS) is maintained during the testing period.

Processing proceeds to operation 440 where simulated workload is initiated and the soak test is started. The simulated workload is applied by initiating the virtual users selected for the soak test scenario of operation 430. During the soak test, various performance parameters are measured and recorded for later review as part of the test results.

Processing proceeds to operation 450 where a virtual user of the simulated workload is terminated. By periodically monitoring the operation of each virtual user during the soak test period, when a virtual user terminates for any reason, the termination is detected.

Processing proceeds to operation 460 where the controller identifies the terminated virtual user. When a virtual user is detected as being terminated, the controller identifies which virtual user terminated so that the same virtual user may be restarted. As stated herein, some embodiments of the present invention advantageously maintain a specific number of virtual users during the test so that additional virtual users are not required.

Processing proceeds to operation 470 where the controller restarts the terminated virtual user to maintain constant transactions per minutes load during the soak test.

Processing ends at operation 480 where the soak test is completed successfully with continuous heavy load required by the soak test having been provided by the operating virtual users including those that were restarted during the test.

Some embodiments of the present invention may include one, or more, of the following features, characteristics and/or advantages: (i) facilitate soak testing when there is a license cost for virtual users while running the soak test; (ii) restarts the virtual user whenever those are abruptly aborted and complete the full test run with a constant transaction per second (TPS); (iii) restarts the virtual user whenever it is terminated and/or aborted to maintain the continuous heavy traffic for a prolonged period; (iv) identifies the terminated virtual user that has been terminated at any stage of performance and soak test run; (v) ensures the soak test runs continuously and is completed successfully with constant transaction per second; (vi) adds details to the soak test report indicating each virtual user terminated and the termination reason, details of each virtual user restarted, average time taken to restart a virtual user to traditional soak test report; and/or (vii) supports an expanding hybrid cloud business model.

Some embodiments of the present invention may include one, or more, of the following features, characteristics and/or advantages: (i) ensures a successful performance and soak test run with constant TPS; (ii) gives the controller the power to identify and restart the virtual user that was terminated or aborted to ensure a successful performance and soak test run with constant TPS; (iii) guarantees continuous heavy load for an extended period to improve and make more useful performance testing and soak testing; (iv) the soak test report provides for improved performance engineering insight that is not conventionally available; and/or (v) maintains a constant transaction per second (TPS) during the soak test, which is a necessary element for an informative soak test and soak test report.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   establishing a virtual user group from a set of virtual users for operation according to a test strategy;
   performing a soak test under a constant transactions-per-second load using the virtual user group;
   monitoring each virtual user of the virtual user group for termination conditions for the duration of the soak test;
   responsive to detecting an abnormal termination condition, identifying the terminated virtual user; and
   restarting a terminated virtual user during the soak test.

2. The computer-implemented method of claim 1, further comprising:
   collecting test report data during performance of the soak test including identification of each virtual user that is terminated, reason for termination of each virtual user, and average restart time for a terminated virtual user to be restarted during the soak test.

3. The computer-implemented method of claim 1, wherein establishing the virtual user group is further according to individual pre-defined characteristics and functions of the virtual users.

4. The computer-implemented method of claim 1, further comprising:
   generating a soak test model using the test strategy; and
   wherein:
   performance of the soak test is done according to the test strategy.

5. The computer-implemented method of claim 1, further comprising:
   presenting a soak test report for the soak test, the soak test report demonstrating a constant transactions-per-second load.

6. The computer-implemented method of claim 1, further comprising:
   maintaining a simulated workload with the virtual users throughout the duration of the soak test.

7. The computer-implemented method of claim 1, wherein the termination condition is an abnormal termination of a virtual user.

8. A computer program product comprising a computer-readable storage medium having a set of instructions stored therein which, when executed by a processor, causes the processor to perform a method comprising:
   establishing a virtual user group from a set of virtual users for operation according to a test strategy;
   performing a soak test under a constant transactions-per-second load using the virtual user group;
   monitoring each virtual user of the virtual user group for termination conditions for the duration of the soak test;
   responsive to detecting an abnormal termination condition, identifying the terminated virtual user; and
   restarting a terminated virtual user during the soak test.

9. The computer program product of claim 8, further causing the processor to perform a method comprising:
   collecting test report data during performance of the soak test including identification of each virtual user that is terminated, reason for termination of each virtual user, and average restart time for a terminated virtual user to be restarted during the soak test.

10. The computer program product of claim 8, wherein establishing the virtual user group is further according to individual pre-defined characteristics and functions of the virtual users.

11. The computer program product of claim 8, further causing the processor to perform a method comprising:
    generating a soak test model using the test strategy; and
    wherein:
    performance of the soak test is done according to the test strategy.

12. The computer program product of claim 8, further causing the processor to perform a method comprising:
    presenting a soak test report for the soak test, the soak test report demonstrating a constant transactions-per-second load.

13. The computer program product of claim 8, further causing the processor to perform a method comprising:
    maintaining a simulated workload with the virtual users throughout the duration of the soak test.

14. The computer program product of claim 8, wherein the termination condition is an abnormal termination of a virtual user.

15. A computer system comprising:
    a processor set; and
    a computer readable storage medium;
    wherein:
    the processor set is structured, located, connected, and/or programmed to run program instructions stored on the computer readable storage medium; and
    the program instructions which, when executed by the processor set, cause the processor set to perform a method comprising:
    establishing a virtual user group from a set of virtual users for operation according to a test strategy;
    performing a soak test under a constant transactions-per-second load using the virtual user group;

monitoring each virtual user of the virtual user group for termination conditions for the duration of the soak test;

responsive to detecting an abnormal termination condition, identifying the terminated virtual user; and restarting a terminated virtual user during the soak test.

16. The computer system of claim 15, further causing the processor to perform a method comprising:

collecting test report data during performance of the soak test including identification of each virtual user that is terminated, reason for termination of each virtual user, and average restart time for a terminated virtual user to be restarted during the soak test.

17. The computer system of claim 15, wherein establishing the virtual user group is further according to individual pre-defined characteristics and functions of the virtual users.

18. The computer system of claim 15, further causing the processor to perform a method comprising:

generating a soak test model using the test strategy; and wherein:

performance of the soak test is done according to the test strategy.

19. The computer system of claim 15, further causing the processor to perform a method comprising:

presenting a soak test report for the soak test, the soak test report demonstrating a constant transactions-per-second load.

20. The computer system of claim 15, further causing the processor to perform a method comprising:

maintaining a simulated workload with the virtual users throughout the duration of the soak test.

* * * * *